Figure 1:
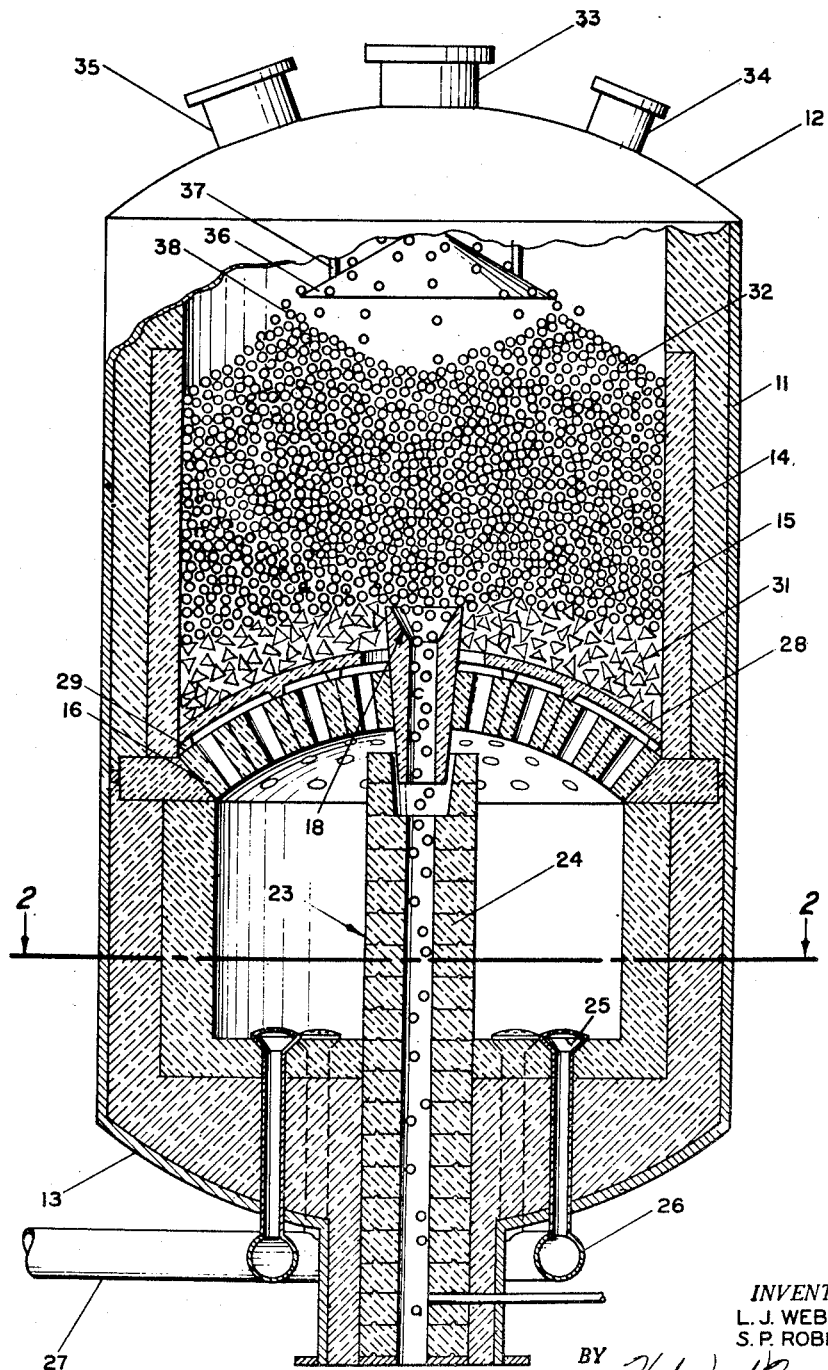

Dec. 12, 1950     L. J. WEBER ET AL     2,534,090
PEBBLE HEATING CHAMBER

Filed Dec. 29, 1947     2 Sheets-Sheet 1

INVENTORS
L. J. WEBER
S. P. ROBINSON
BY *Hudson and Young*
ATTORNEYS

Dec. 12, 1950  L. J. WEBER ET AL  2,534,090
PEBBLE HEATING CHAMBER
Filed Dec. 29, 1947  2 Sheets-Sheet 2
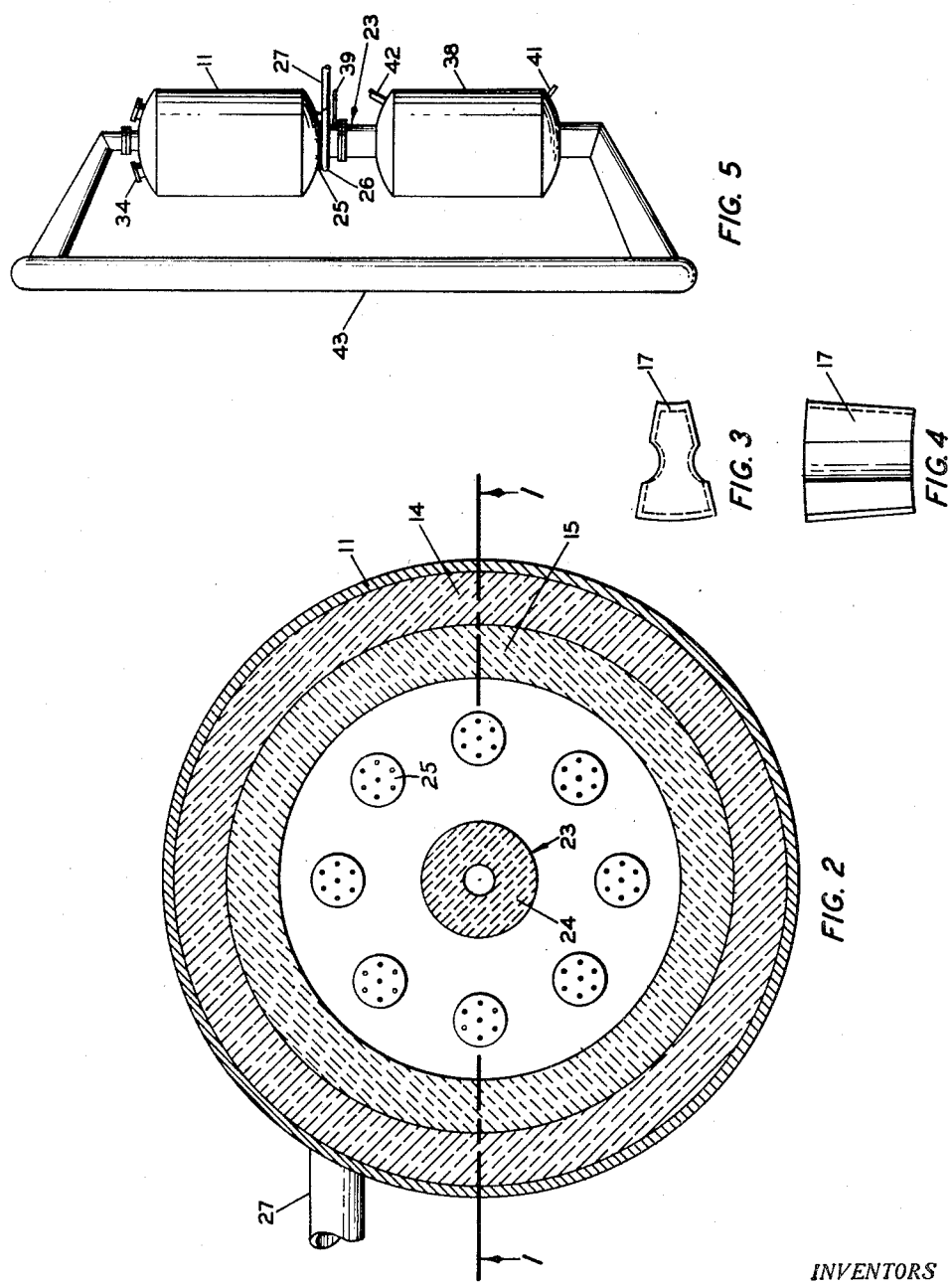
INVENTORS
L. J. WEBER
S. P. ROBINSON
BY Hudson and Young
ATTORNEYS

UNITED STATES PATENT OFFICE 2,534,090

PEBBLE HEATING CHAMBER

Louis Joe Weber and Sam P. Robinson, Bartlesville, Okla., assignors to Phillips Petroleum Company, a corporation of Delaware Application December 29, 1947, Serial No. 794,380

2 Claims. (Cl. 263—19)

This invention relates to pebble heater apparatus. In one of its more specific aspects it relates to thermal conversion or treating apparatus. In another of its more specific aspects it relates to pebble heating or regeneration chambers of a pebble heater apparatus and method of operation.

Thermal conversion processes carried on in so-called pebble heating apparatus utilize a flowing mass of pebbles which is heated to a high temperature in a first direct heat exchange step and is then caused to contact gaseous materials, furnishing heat thereto, in a second direct heat exchange. The conventional pebble heater apparatus comprises two chambers which may be disposed in substantially vertical alignment. Solid heat exchange material, such as refractory pebbles, is introduced into the upper portion of a first chamber. The solid heat exchange material flows downwardly through the chamber in direct heat exchange with a hot gaseous heat exchange material. The solid heat exchange material is heated to a high temperature in such heat exchange and is then passed to a second chamber in which it is caused to contact gaseous materials in a second direct heat exchange relation, furnishing heat to such materials.

Most conventional pebble heaters are provided with a combustion chamber adjacent or in close proximity to the lower portion of the first chamber. Hot combustion gas from the combustion chamber is injected through the sides of the first chamber, better known as the pebble heating chamber. Pebbles which pass downwardly through the heating chamber contact the rising combustion gas and are heated as above described. One disadvantage of such pebble heater apparatus is that pebbles near the periphery of the pebble bed in the heating chamber are heated to a higher temperature than those in the center of the downwardly flowing bed. This is due to the fact that a greater portion of the combustion gas tends to take the path of least resistance through the pebble bed. In most pebble heater apparatus, pebbles are introduced into the pebble heater chamber through a single opening in its top. Pebbles are withdrawn from a point substantially centrally located in the area of the heating chamber. As pebbles flow through the chamber they tend to form a cone, downwardly and outwardly from the pebble inlet, and the pebbles flowing out of the chamber tend to form an inverted cone downwardly and inwardly toward the pebble outlet. It will be seen that due to the cone shaped top and bottom of the bed, the area near the periphery of the bed is the thinnest and usually the point of least resistance for upwardly flowing gas. Gas tends to pass directly upwardly from the gas inlet, through the periphery of the bed and out of the effluent outlet in the top of the chamber. A portion of the pebble bed below the moving cone of pebbles is relatively stagnant. Once these pebbles in the stagnant area are heated they lose very little of their heat and thus receive very little heat from the gas passing upwardly therethrough. For that reason, gas leaving the heating chamber through the effluent outlet carries with it a considerable amount of heat which could have been imparted to cooler pebbles in the central portion of the pebble heater chamber.

Another disadvantage of the conventional type pebble heating chamber in which heating gas is injected through the side walls of the chamber is that when openings are made in the side walls of the chamber the walls are weakened thereby. In order to give the walls and insulating lining sufficient strength to support themselves, it is necessary to furnish heavier support means therefore around such openings.

An object of the invention is to provide an improved chamber for heating pebbles in pebble heater apparatus. Another object is to provide an improved method for heating pebbles in pebble heating apparatus. Another object is to provide an improved combustion chamber for a pebble heater. Another object is to provide improved means for supporting a pebble bed within heating chambers of pebble heater apparatus. Another object is to provide improved communication means between pebble heating and gas heating chambers of pebble heater apparatus. Another object is to provide means for more evenly heating a given cross section of a flowing pebble bed in such a pebble heater chamber. Another object is to provide a strong compact pebble heater chamber. Another object is to provide an improved method for heating said pebbles. Other and further objects will be apparent to those skilled in the art on reference to the accompanying discussion, drawings and the claims.

The term "pebble," as used herein, denotes any solid refractory material of flowable form, size, and strength which is suitable to carry large amounts of heat from the pebble heating chamber to the gas heating chamber. Pebbles conventionally used in pebble heater apparatus are substantially spherical in shape and are from about one-eighth inch to about one inch in diameter. In high temperature processes, pebbles having a diameter of approximately three-eighths inch are preferred. The pebbles must be formed of a refractory material which will withstand temperatures at least as high as the highest temperature attained in the pebble heating chamber. The pebbles must also be capable of withstanding temperature changes within the apparatus. A refractory material, such as a metal, ceramic, or other satisfactory material may be utilized to form such pebbles. Satisfactory pebbles may be formed of silicon carbide, alumina, periclase, beryllia, Stellite, zirconia, and mullite in admixture with each other or with other materials. Pebbles formed of such materials, when properly fired, serve very well in high temperatures, some withstanding temperatures up to about 3500° F. Pebbles which are inert or catalytic may be used in any selected process.

Understanding of the invention will be facilitated upon reference to the attached drawings in which Figure 1 is a diagrammatic partial section view of a pebble heating chamber embodying the invention. Figure 2 is a horizontal cross section taken on the line 2—2 of Figure 1. Figure 3 is a top view of a brick of the type used in the construction of the dome shown in Figure 1. Figure 4 is a side view of such a brick. Figure 5 is a schematic view of a pebble heater apparatus showing the relation between the pebble heater and reactor chambers, the fuel supply header member and the path of pebble recycle.

In Figure 1 shell 11 is preferably an unbroken cylinder which is closed at its ends by closure members 12 and 13. The wall of shell 11 is lined with insulating means, such as common refractory materials 14 and super-refractory materials 15 which are backed by common refractory materials. Common refractory materials 14 may include block insulation, insulating fire brick, and fire clay fire brick or layers of any two or all of them. Super-refractory materials 15 may include silicon carbide, mullite, or alumina or any other suitable refractory having physical and chemical properties which give it sufficient strength to withstand heavy loads and high temperature without substantial breakage or deterioration. The insulating material preferably forms an unbroken lining for the unbroken cylindrical wall of shell 11. Silicon carbide may be satisfactorily used in operations utilizing temperatures up to about 3000° F. Mullite can be satisfactorily used with temperatures up to about 3000° F. and alumina may be satisfactorily used at temperatures up to about 3300° F. The above materials may be used at those temperatures, without substantial oxidation or reaction, with most conventionally used pebbles. Super-refractory material 15 is positioned so as to form an inner lining in the lower portion of shell 11. Layers of common refractory and super-refractory materials are also provided to insulate the bottom of said shell.

Dome 16 is provided within shell 11 at a point intermediate the ends of the chamber contained within shell 11 and the insulation lining as disclosed and claimed in U. S. application Serial No. 787,413, filed November 21, 1947, by one of us. Dome 16 is convex and is preferably constructed of super-refractory bricks 17 which are connected together to form self-supporting rings, the self-supporting rings also giving support to one another to form the load-supporting dome 16. These bricks are constructed in the form of plugs which taper inwardly on all four lateral sides from top to bottom as shown in Figures 3 and 4. Two of the sides are grooved so that when a brick is fitted or connected with an adjacent brick the grooves form communication means or openings which extend from the space below to the space above said dome. The other two lateral sides are curved from side to side, one side being convex and the other concave. A first pebble conduit means, such as refractory throat 18, is provided substantially centrally in said dome and extends into a heating zone formed above said dome, preferably for a small distance. The throat extends downwardly into a combustion zone formed below the dome, also preferably for a short distance. Throat 18 is preferably constructed of a plurality of elongated super-refractory sections. When assembled throat 18 has a tubular opening extending centrally therethrough which is substantially coaxial with shell 11. The outer surface of throat 18 is tapered so as to substantially coincide with the faces of the bricks comprising the inner ring of refractory dome 16. Dome 16, as so constructed, is not only self-supporting but is capable of supporting a load of at least 1000 pounds per square foot at operating temperatures while expanded by such operating temperatures. Extending upwardly through the bottom of the chamber formed by shell 11 and closure members 12 and 13 is a second pebble conduit means 23, at least a portion of which is preferably constructed of a plurality of refractory rings 24 which are provided with tongues on one side and grooves on the other side, which tongues and grooves reciprocate to hold the rings in a coaxial position. Conduit means 23 extends upwardly through the combustion zone and communicates with throat 18 by means of an expansion joint formed by a slidable connection between throat 18 and conduit means 23. Conduit means 23 is so formed that a tubular opening of substantially the same diameter as that in throat 18 extends through its length. The upper inner diameter of means 23 is enlarged so as to allow the insertion of throat 18 thereinto, forming a slide expansion joint therebetween. Means adapted so as to inject combustible materials into the combustion zone formed beneath dome 16 and to burn the combustible materials within that zone are provided within the bottom of the heating chamber. Such means comprises preferably at least four pressure-type radiant burners 25 which are distributed about the bottom area of the combustion zone and open into that zone. Burners 25 are vertically positioned so as to inject combustible materials vertically into the combustion zone without interfering with the burning of any other one of the burners. Fuel inlet header member 26 is provided preferably below the bottom of the pebble heating chamber and communicates with the lower ends of burners 25. Fuel supply conduit 27 communicates between a fluid supply source and fuel inlet header 26.

Baffle means, such as refractory plate 28, is provided to cover at least a portion of dome 16. Apertures are left under plate 28 so as to allow the passage of gases inwardly and upwardly underneath the plate and the escape of such gases at the upper-inner end of the plate. The baffle means may be of any desired size so as to allow the desired opening for the escape of gas in its central portion. Plate 28 may have lugs 29 provided thereon to separate it from dome 16 or may be corrugated on its lower side. The baffle means construction must meet the requirements for baffling while at the same time being of sufficient strength to support, with the aid of dome 16, a layer of aggregate material 31 and a moving bed of pebbles 32 thereabove. Pebble inlet means, such as conduit 33, is provided in the upper portion of the heating chamber, preferably extending substantially centrally through closure member 12. Combustion gas outlet means, such as conduit 34, is also provided in the upper portion of the heating chamber, preferably in closure member 12. A manhole or access opening 35 is also provided in closure 12. Baffle means, such as conical member 36, shown in Figure 1 below conduit 33 is affixed to closure member 12 by bracket members, such as bolts 37.

Separation means, such as a layer of aggregate material 31, is provided to cover dome 16 and the baffle means. Alternate separation means, such as a refractory cone may be utilized in place of the layer of aggregate material. Refractory throat 18 should extend upwardly into the heating zone far enough to retain the aggregate material therein and prevent it from falling through the tubular opening therein. One of the purposes of such separation means is to prevent the pebbles from falling through and clogging the perforations within dome 16. Another purpose of such means is to provide a plenum chamber in which the heating gas will become further tempered. The heating chamber may be satisfactorily supplied without such a separation means by proper sizing and positioning of the baffle means but use of such separation means is preferred.

In Figure 5 the pebble heater chamber contained within shell 11 is disposed substantially vertically above a gas heating chamber contained within shell 38. Conduit means 23 communicates between the bottom of the chamber formed within shell 11 and the top of the chamber formed within shell 38. Fluid conduit 39 communicates between a fluid supply source and the tubular opening extending the length of conduit 23. Fuel header means 26 encircles conduit 23 and communicates with burners 25. Fuel supply conduit 27 communicates between header means 26 and a fuel supply source. Effluent outlet 34 extends from the top of shell 11. Reactant material inlet means, such as conduit 41, is provided in the lower portion of shell 38. Effluent material outlet means, such as conduit 42, are provided in the top of shell 38. Pebble recycle means, such as elevator 43, is provided to transport pebbles from the bottom of the gas heating chamber contained within closed shell 38 to the upper portion of the heating chamber contained within shell 11.

In the operation of the device shown in Figures 1 and 5 of the drawings, pebbles made from any selected refractory material suitable for the process to be carried on within the apparatus are inserted into the upper portion of a heating chamber through pebble inlet 33. The pebbles pass downwardly and cover the layer of aggregate material 31 and build up a bed of pebbles in the heating chamber. The top center of the pebble bed is formed in the shape of an inverted cone. The cone extends upwardly to form an annular ridge 38 adjacent the lower edge of baffle 36. From ridge 38 the bed slopes outwardly and downwardly to the chamber wall. Gaseous combustible materials, together with an oxygen-containing gas, which may be in excess of that needed to supply oxygen for the combustion of the combustible materials, are vertically injected into the heating zone beneath the refractory dome through the burners therein. Combustion gas passes from the burners vertically through the combustion zone wherein any remaining combustible materials are burned and the excess oxygen containing gas is heated to a relatively high temperature. By this type of injection of combustible materials, the flow of combustion gas does not interfere with the burning of combustible materials by any one of the other vertical burners. The excess oxygen-containing gas may be injected for the purpose of tempering or controlling the temperature of the combustion gas in the combustion zone. The combustion gas, together with any excess oxygen-containing gas, passes upwardly through the perforate dome and is directed by the baffle means inwardly toward the axis of the chamber. As the gas passes from under the baffle means, it rises through the bed of pebbles in direct heat exchange therewith, raising the pebbles to a high temperature. As the pebbles within the moving bed may have carbonaceous or asphaltic deposits thereon, those deposits may be oxidized by the oxygen-containing gas. The oxidation of coke or asphaltic materials with the excess oxygen is an exothermic reaction and additional amounts of heat may be supplied to the pebbles by such reaction. As the combustion gas exits from the top of the bed, it escapes from the chamber through outlet 34. The heated pebbles contiguously pass downwardly through the pebble conduit formed by throat 18 and the conduit means 23 into the gas heating chamber within shell 38. The gas heating chamber, the pebble conduit and at least a portion of the pebble heating chamber are filled with the moving bed of pebbles. In some cases, a pebble surge chamber may be arranged ahead of the pebble heating chamber. When such an arrangement exists, sufficient pebbles may be supplied to fill the space above the dome in the heating chamber. Gaseous materials are injected into the lower portion of the gas heating chamber through inlet conduit 41. The gaseous materials rise through the gas heating chamber, gaining heat from the downwardly flowing pebbles and pass rapidly out of the gas heating chamber to effluent outlet conduit 42. Pebbles which have been cooled during the gas heating step pass out of the gas heating zone and are carried by elevator 38 to the upper portion of the pebble heating chamber wherein they are once again subjected to the pebble heating step described above.

A pebble heating chamber utilizing the refractory dome of this invention may be operated without baffle means such as refractory plate 26. The advantage of using such baffle means, however, is apparent in that it prevents an undue amount of the heating gas from passing through the bed periphery leaving those pebbles contained within the central portion of the bed considerably cooler than the pebbles in the periphery. Pebbles within the pebble heating chamber tend to form stagnant zones along the periphery of the bed to an angle of about 40° to 70° from the horizontal. For this reason a large portion of the pebbles on the side of the chamber remain within the stagnant area and once raised to a high temperature by the rising combustion gas are maintained at that temperature without substantially decreasing the temperature of a combustion gas passing therethrough. This results from the loss of large quantities of heat by the passage from the pebble heating chamber of combustion gas which is still at a high temperature. It is therefore obviously economical to utilize baffle means which will direct the hot combustion gas from the combustion zone into the central portion of the heating chamber where the combustion, together with the excess oxygen-containing gas, contacts the cooler pebbles of the moving pebble bed. The pebbles which are contained in the moving portion of the bed and which do not remain in the stagnant areas will have greater amounts of carbonaceous or asphaltic material deposits thereon and will thus receive more benefit by contact with oxygen-containing gas. As the gas passes upwardly it will tend to spread through the heating zone, thus contacting and heating those pebbles which are moving downwardly through the chamber.

In some instances combustion gas may be carried from the pebble heating chamber into the gas heating chamber with the pebbles, or conversion products may rise from the gas heating chamber through the pebble conduit into the pebble heating chamber. Such an occurrence would cause the conditions in either chamber to be unstable. For that reason a fluid conduit has been provided to convey a hot gas, such as steam, which is inert to the reaction, into the pebble conduit as a choke means. A coke means would prevent other gas from passing therethrough.

*Specific example*

A pebble heater apparatus, the pebble heating chamber of which is divided into heating and combustion zones, by a perforate silicon carbide dome intermediate its ends, is filled with alumina pebbles of ⅜ inch diameter so that the pebbles form an uninterrupted bed from the bottom of the gas heating chamber through the connecting pebble conduit and a substantial space up into the heating zone. When the apparatus is so loaded the dome supports about 900 pounds per square foot.

In the operation of the apparatus, pebbles are withdrawn from the bottom of the gas heating chamber and are elevated to the top of the pebble heating chamber. Methane-rich gas, together with oxygen-containing gas, is introduced vertically by means of burners into the combustion zone where the methane-rich gas is burned. An excess of oxygen-containing gas to substantially complete combustion of the methane-rich gas, to temper resulting combustion gas and to oxidize the carbonaceous or asphaltic depositions on the moving pebbles, is introduced through the burners. Combustion gas, together with the excess oxygen-containing gas, passes upwardly through the perforate dome and is directed inwardly by baffles into the center portion of the heating chamber. Temperature of the combustion zone is maintained in the vicinity of about 2400° F. while gas issuing from the top of the pebble bed is at about 900° F. Pebbles are circulated through the apparatus at the rate of about 27 tons per hour. As the pebbles pass downwardly through the gas heating chamber they give up a portion of their heat in direct heat exchange to gaseous material being passed in countercurrent flow thereto.

As will be evident to those skilled in the art, various modifications of this invention can be made or followed in the light of the foregoing disclosure, discussion and example without departing from the spirit or scope of the disclosure or from the scope of the claims.

We claim:

1. In a pebble heater system utilizing a moving bed of heated pebbles, the method of heating said pebbles, comprising in combination the steps of introducing pebbles into the upper portion of a pebble heating zone; passing said pebbles to points relatively close to the periphery of the upper portion of said heating zone and forming a fluent contiguous pebble mass therebelow; introducing combustible materials vertically into a combustion zone disposed below said pebble heating zone; burning at least a portion of said combustible materials in said combustion zone; passing hot combustion gas resulting from said burned combustible materials from said combustion zone upwardly into said pebble heating zone; directing said gas inwardly toward the axis of said pebble heating zone; passing said gas upwardly through said pebble heating zone in direct heat exchange with pebbles therein; removing said combustion gas from the upper portion of said pebble heating zone; and removing said pebbles from the lower portion of said pebble heating zone.

2. An improved pebble heating chamber comprising an upright closed outer shell having an unbroken side wall; insulating means within and adapted so as to insulate said shell; pebble inlet means centrally disposed in the upper portion of said heating chamber; a baffle member disposed below said pebble inlet means and in the upper portion of said heating chamber, said baffle extending downwardly and outwardly from an apex toward the side wall of said chamber; gaseous effluent outlet means in the upper portion of said heating chamber; a perforate refractory load-supporting dome within said chamber, intermediate the ends of said heating chamber and dividing said chamber into a heating zone above said dome and a combustion zone below said dome; pebble outlet conduit means extending substantially centrally through said dome and downwardly through said combustion zone and the bottom of said shell; and a plurality of upright burners in the bottom of said shell, spaced inwardly from the side wall of said heating chamber and distributed about said combustion zone.

LOUIS JOE WEBER.
SAM P. ROBINSON.

REFERENCES CITED

The following references are of record in the file of this patent:

UNITED STATES PATENTS

| Number | Name | Date |
|---|---|---|
| 50,836 | Minthorn | Nov. 7, 1865 |
| 2,389,636 | Ramseyer | Nov. 27, 1945 |
| 2,417,049 | Bailey et al. | Mar. 11, 1947 |
| 2,432,885 | Hasche | Dec. 16, 1947 |
| 2,443,337 | Weber | June 15, 1948 |
| 2,444,274 | Utterback | June 29, 1948 |